United States Patent Office 3,513,557
Patented May 26, 1970

3,513,557
MACHINE FOR TESTING THE PROFILE AND HELIX ANGLE OF INTERNAL GEAR WHEELS
Karl Muller, Zurich, Switzerland, assignor to Maag Gear Wheel & Machine Company Limited, Zurich, Switzerland, a company of Switzerland
Filed July 16, 1968, Ser. No. 745,163
Claims priority, application Germany, July 21, 1967, 1,623,244
Int. Cl. G01b 7/28
U.S. Cl. 33—179.5                                6 Claims

ABSTRACT OF THE DISCLOSURE

An instrument for testing the tooth flanks of a helical gear wheel, of the kind disclosed in United States of America Pat. No. 2,770,048, having a feeler which traverses the involute profile and a helical generating line of the tooth flank, and comprising a generating cylinder adapted to receive a test piece, a bar adapted to roll on said generating cylinder, an auxiliary slide adapted to move in parallel to said bar, a slideway disposed in a plane which is parallel to the generating cylinder axis and to the generating bar and being adjustably inclined to the axis and being adapted to drive the auxiliary slide, a ratio lever adapted to pivot on a pin which is provided on a bearing housing of a spindle for the test piece and which couples the auxiliary slide to the generating bar and whose transmission ratio is adjustable in accordance with the ratio of the generating cylinder diameter and the base circle of the test piece, a support for supporting the feeler and the inclined slideway, and means for moving said support and said test piece transversely and axially relative to the test piece axis, is modified by disposing the feeler and the inclined slideway at opposite ends of the support and positioning the said feeler and inclined slideway for the test piece to be located therebetween.

---

Figure 1:
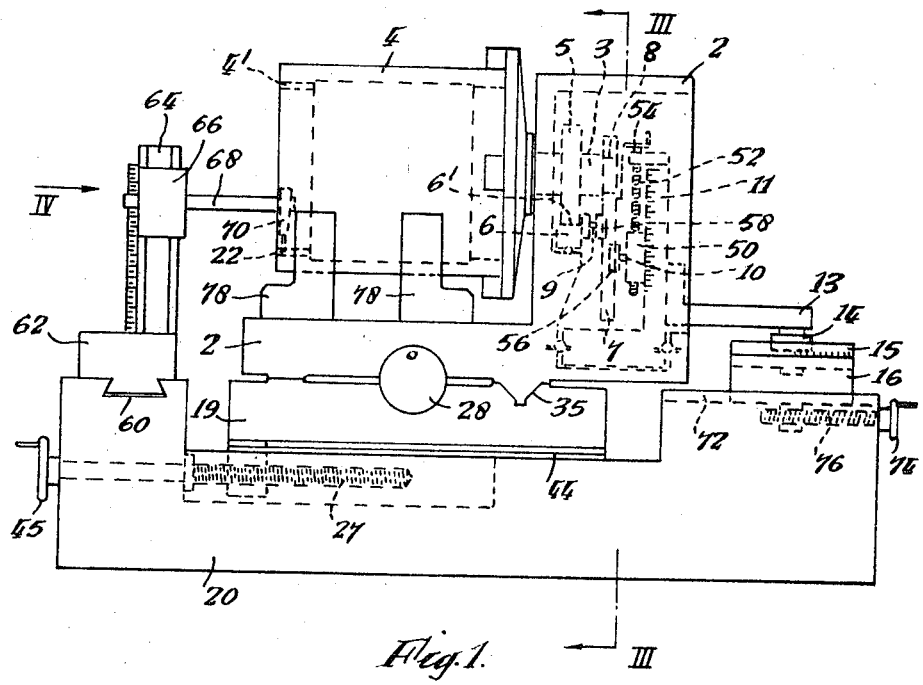

This invention relates to instruments for testing the tooth flanks of a helical gear by means of a feeler which traverses the involute profile and a helical line of the tooth flank, comprising a generating cylinder adapted to receive a test piece or a helical gear to be tested, a bar adapted to roll on said generating cylinder, an auxiliary slide adapted to move in parallel to said bar, a slideway disposed in a plane which is parallel to the generating cylinder axis and to the generating bar and being adjustably inclined to the axis and being adapted to drive the auxiliary slide, a ratio lever adapted to pivot on a pin which is provided on a bearing housing of a spindle for the test piece and which couples the auxiliary slide to the generating bar and whose transmission ratio is adjustable in accordance with the ratio of the generating cylinder diameter and the base circle of the test piece, a support for supporting the feeler and the inclined slideway, and means for moving said support and said test piece transversely and axially relative to the test piece axis.

An instrument of the kind hereinbefore described is disclosed in the specifications of British Pat. No. 736,574 and United States of America Pat. No. 2,770,048 which correspond to each other. Therein, the inclined slideway and the feeler on the support are disposed closely superjacently and the support traverses on a slide track for the relative motion of said support and test piece, the said slide track being disposed in parallel to the gear wheel axis closely adjacent to the tooth to be tested. With this arrangement it is only possible for internal gearing to be tested under very limited conditions.

It is the object of the invention to eliminate this disadvantage, and in particular to facilitate the testing of internal gearing on long tubular test pieces.

According to the present invention, in an instrument of the kind hereinbefore described, the inclined slideway and the feeler are disposed at opposite ends of the support and are positioned for the test piece to be located therebetween. The slideway and the feeler are therefore in positions so far apart from each other that the gear to be tested can be accommodated between them. This feature offers the possibility of allowing the feeler to extend into an internally toothed test piece even if said test piece is of tubular construction and is relatively long.

A particularly practical embodiment of the invention is obtained if the support of the feeler and of the inclined slideway also constitutes the bed of the instrument. The slide track for the relative motion of the support and of the test piece axis along the test piece axis will then be mounted on the bed and the test piece is slideable on said bed in the axial direction in order to test the helix angle.

This coaxial arrangement is not possible in the known instrument hereinbefore referred to.

In order to set up the instrument for test pieces of substantially different dimensions it is recommended that the feeler is adapted to be adjustable on the support in parallel to the test piece axis and in both transverse directions relative to said axis. This is not possible in the known instrument hereinbefore referred to.

For the same reason it is appropriate for the carrier of the inclined slideway to be adjustable in parallel to the test piece axis on the support which also supports the feeler. By contrast, the carrier of the inclined slideway was fixedly mounted on the support of the known instrument hereinbefore referred to.

A particularly compact construction is obtained if the support of the feeler and of the inclined slideway is provided therebetween with a bearing housing for the test pieces, said bearing housing being disposed on compound slides and being provided not only with a slide track for the generating bar but also with a slide track for the auxiliary slide. In the known instrument hereinbefore referred to the slide track for the auxiliary slide is mounted on a pedestal which forms the slide track for a common support of the feeler and of the inclined slideway.

Figure 2:
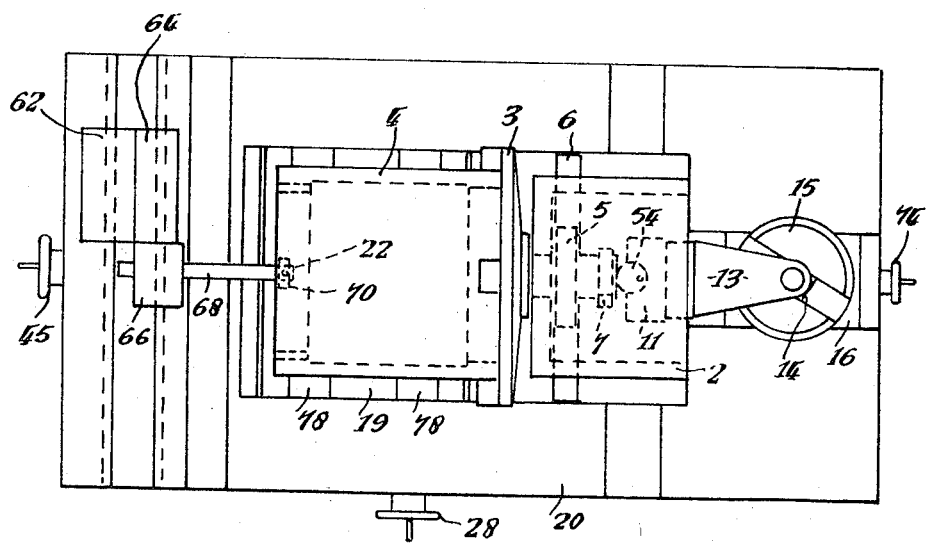
Figure 4:
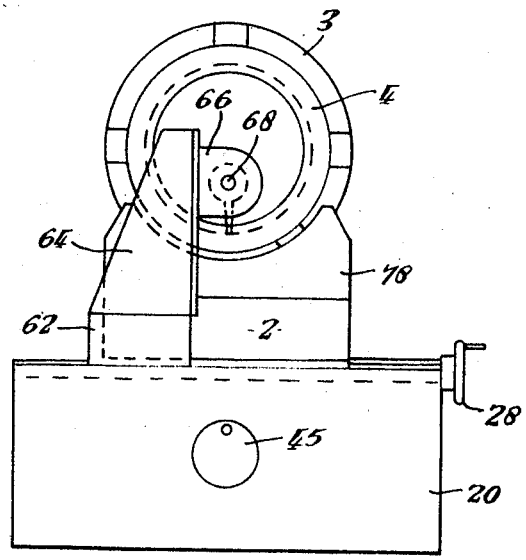
Figure 3:
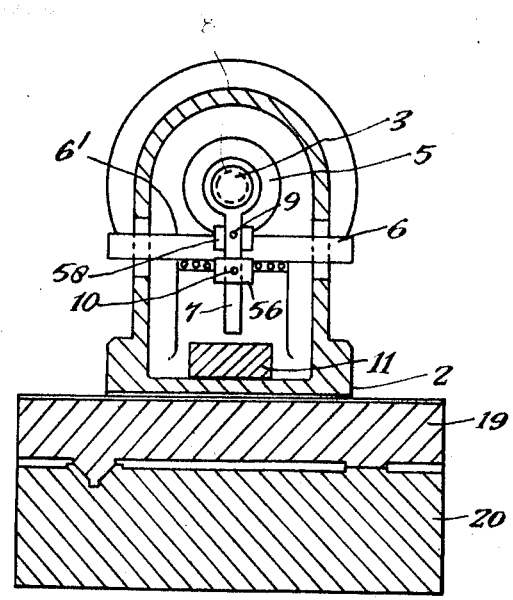

One embodiment of the invention is shown in the accompanying drawings, wherein:

FIG. 1 is a side elevation;
FIG. 2 is a plan view corresponding to FIG. 1;
FIG. 3 is a transverse sectional elevation taken on the line III—III in FIG. 1; and
FIG. 4 is an end elevation looking in the direction of the arrow IV in FIG. 1.

To the extent to which parts of the known instrument disclosed in the specifications of British Pat. No. 736,574 and United States of America Pat. No. 2,770,048 correspond to those of the present invention they are provided with the same reference numerals.

A test piece such as a helical gear is relatively long and tubular and is provided with internal gearing 4'. The apparatus according to the present invention is intended to test the involute profile as well as the helix angle of the flanks of the internal gearing 4'.

To this end the test piece 4 is mounted on a horizontal spindle 3 whose bearing housing 2 forms the generating slide. A bar 6, guided to slide in its axial direction on a slide track provided by the bearing housing 2, rolls against a generating cylinder 5 which is mounted on the spindle 3. An auxiliary slide 11 is guided to slide parallel to the bar 6 and is driven by virtue of the fact that an arm 13, rigidly mounted thereon, is provided with a block 14 which is guided to slide in a diametrally extending groove in a rotatable disc 15. The disc 15 is mounted on a carrier 16 and is disposed in a plane which extends parallel to the axis of the generating cylinder 5 and of the bar 6. The groove of the disc 15 forms a slideway which can be adjusted to a desired angle to the axis of the generating cylinder 5. The inclined slideway provided by the grooved disc 15, its carrier 16, and the feeler 22 are supported by a common support 20. A ratio lever 7, adapted to pivot on a pin 8 which is mounted on the bearing housing 2 of the test piece spindle 3, couples the auxiliary slide 11 to the bar 6. The transmission ratio of the ratio lever 7 can be adjusted in accordance with the ratio of the diameter of the generating cylinder 5 to the diameter of the base circle of the gear test piece 4.

Means are also provided for the relative movement of the support 20 and of the test piece 4 transversely and axially relative to the test piece axis. To this extent, the principle of the exemplified embodiment of the present invention corresponds to that disclosed in the said British and United States of America patent specifications. The essential difference however is that the inclined slideway provided by the grooved disc 15 and the carrier 16 therefor, and the feeler 22 are disposed on opposite ends of the support 20 and at opposite ends of the test piece 4. The support 20 forms the bed of the machine, the test piece axis being horizontal. As shown in FIG. 1, the feeler 22 is disposed on the left-hand side of the bed 20, and the inclined slideway 15 and carrier 16 are disposed on the right-hand side of the bed 20, the test piece 4 being disposed therebetween.

The pivot pin 8 of the ratio lever 7 is disposed coaxially with the test piece spindle 3, and is formed by a section of said spindle.

The auxiliary slide 11 is guided by balls in the bearing housing 2 to slide transversely to the axis of the spindle 3. Adjustment of the transmission ratio of the ratio lever 7 is made possible owing to the fact that a pivot pin 10 which couples the ratio lever 7 to the auxiliary slide 11 is adjustable on said auxiliary slide 11. To this end the pin 10 is disposed on a slide 50 which is adjustable vertically by means of a screw-threaded spindle 52 and a handwheel 54 on the auxiliary slide 11. The pin 10 rotatably supports a sliding block 56 which embraces the ratio lever 7 and is slidingly guided therealong. A pin 9 is secured on the bar 6, the axis of the pin being in the plane of the operative surface 6' of the bar 6, and rotatably supports a sliding block 58 which embraces the ratio lever 7 and is slidingly guided therealong.

The means for a relative traversing of the support 20 and the gear to be tested in the directions of the axis of the gear and transversely thereto will now be described. To this end the support 20 of the feeler 22 and of the disc 15 is provided between said members with the bearing housing 2 for the test piece spindle 3 on compound slides. The lower of the two compound slides is indicated at 19 and moves on a slide track 44 of the support 20. The slide track 44 extends parallel to the axis of the test piece 4 and therefore permits the displacement of the test piece for testing the helix angle thereof in such a way that the feeler 22 is displaced longitudinally relative to the tooth to be tested. The slide 19 is provided with a slide track 35 which extends transversely of the test piece axis and which supports the generating slide formed by the spindle housing 2.

The feeler 22 is adjustable on the support 20 parallel to the test piece spindle axis and in both transverse directions relative to said axis. To this end, the support 20 is provided with a slideway 60, extending transversely to the test piece axis, a slide 62 being slidably disposed on the slideway 60. The slide 62 is provided with a pedestal 64 having a vertical slide track on which a holder 66 is slidably disposed. The holder 66 has a bore which is parallel to the test piece spindle axis and in which a rod 68 is slidably and adjustably guided. The rod 68 is provided with an arm 70 which carries the feeler 22. The rod 68 extends into the interior of the hollow workpiece 4, thus permitting the testing of the internal gearing 4'.

The carrier 16 of the grooved disc 15 which provides the inclined slideway is adjustable on the support 20 in parallel to the test piece spindle axis. To this end, the support 20 is provided with a slide track 72 which extends in parallel to the test piece spindle axis and slidingly guides the carrier 16. A screw-threaded spindle 76, provided with a handwheel 74 and rotatably journalled on the underpart of the support 20, serves for traversing the carrier 16, the screw spindle 76 engaging in a screw-threaded bore disposed on the carrier 16.

The bearing housing 2 which forms the generating slide is adjustable on the slide track 35 by means of a screw-threaded spindle which is provided with a handwheel 28. Adjustment of the slide 19 on the slide track 44 is obtained by a screw-threaded spindle 27 which is provided with a handwheel 45 and is journalled in the support 20 and engages in a screw-threaded bore of the slide 19.

Setting pedestals 78, on which the test piece 4 is supported, are mounted on the generating slide 2.

The embodiment of the invention described hereinbefore may be modified in many different manners. For example, it is possible for the support 20 to be disposed vertically, and to this end for it to be constructed as a stand provided with a foot. It would also be possible for the bearing housing 2 to be constructed as a stationary stand to slidably support the slide 19 and the support 20 in the manner of compound slides.

To test the helix angle of the gearing 4', the feeling point of the feeler 22 is so adjusted that it is disposed in the vertical plane which accommodates the test piece axis and coincides with the base circle of the gearing 4'. This adjustment may be obtained by displacement of the slide 62 and of the holder 66. The slide 50 must also be adjusted by the handwheel 54 in accordance with the base circle radius of the gearing 4'. The disc 15 is rotated to a position corresponding to the base helix angle of the gear to be tested. The grooved disc 15 is adjusted along the track 72 by the handwheel 74 to correspond to the position of the tooth width on the test piece 4. The helix angle is then tested by displacing the slide 19 with the bearing housing 2 in parallel to the test piece axis by means of the handwheel 45. This displacement is transmitted to the arm 13 whereupon the sliding block 14 slides in the inclined guideway of the grooved disc 15, thus displacing the arm 13 on the auxiliary slide 11 together with sliding block 50 on which the sliding block 56 is disposed. The ratio lever 7 is therefore provided with a pivoting motion about the test piece axis thus causing the pin 9 to be driven and for the motion to be transmitted to the bar 6 at the ratio of the base circle diameter to the diameter of the generating cylinder 5. The bar adheres magnetically on the generating cylinder 5 and therefore rotates said cylinder and with it the test piece 4. If the theoretically correct helix angle is maintained in the gearing 4' the feeler 22, which bears under light pressure on the tooth flank, will remain in one and the same position. Any motion of the feeler, that is to say deviating of the helix angle from the specified value, are recorded to an enlarged scale on graph paper by known electronic recording means which are not shown in detail.

If it is desired to check the helix angle at another tooth height position of the tooth flank it will be necessary for the bearing housing 2 to be displaced transversely to the test piece axis by means of the handwheel 28. Because of this displacement the generating cylinder 5 rolls, together with the gear 4, on the bar 6. Simultaneously, the sliding blocks 56 and 58 are turned somewhat as also is the ratio lever 7. The auxiliary slide 11 and the axis of the sliding block 56 do not move. These motions harmonize with the motions during testing the tooth profile and this procedure causes the test piece 4 to be rotated into the new starting position.

To test the involute profile of the gearing 4' it is necessary for the feeler 22 to be perpendicularly adjusted relative to the base circle radius of the gearing 4' in the perpendicular plane which accommodates the test piece axis and to traverse said feeler in parallel to the test piece axis on to the desired position of the helix width. In all other respects the system is set up in the same way as described for testing the tooth angle. The handwheel 28 is then rotated. If the theoretically correct involute profile is obtained the feeler 22 will not execute any movement. The precise movements responsible for this feature are described in the aforementioned British patent specification No. 736,574 and U.S. Pat. No. 2,770,048 and a repetition of a description thereof is not necessary.

The handwheels 28 and 45 may be replaced by transmissions with electric motors are described in the aforementioned patent specifications. In each case it is possible that the internal gearing 4' can be tested while the feeler is in view. The adjustability of the grooved disc 15 by means of the handwheel 74 offers the advantageous possibility of confining the slideway formed by the grooved disc only to the maximum width of the gearing to be tested, irrespective of the position of the tooth width in the different gear wheels to be tested. For this reason it is possible for the length of the groove of the disc 15 to be made relatively short. This is desirable because said groove must be machined with a very high degree of accuracy.

The apparatus according to the present invention is also capable of testing external gearing with the same setting data.

What I claim and desire to secure by Letters Patent is:

1. An instrument for testing the tooth flanks of a helical gear, comprising a support member, a housing, constituting a generating slide, mounted upon the support member and adapted to slide thereon in each of two directions at right angles to each other, a generating cylinder mounted rotatably in the generating slide with its axis parallel to the first of said sliding directions of the generating slide, the said generating cylinder being adapted for a helical gear which is to be tested to be mounted coaxially thereon, a generating bar, having a planar operative surface, mounted in the generating slide for linear movement in a direction to the second of said sliding directions of the generating slide, the generating cylinder and the generatig bar being relatively mounted for the generating cylinder to roll on the planar operative surface of the generating bar during such linear movement of the generating bar, an auxiliary slide mounted in the generating slide for sliding movement parallel to the direction of linear movement of the generating bar, a ratio lever pivotally mounted in the generating slide on an axis parallel to the said first sliding direction of the generating slide and to which lever both the generating bar and the auxiliary slide are coupled in a ratio which is adjustable to accord with the ratio of the diameter of the generating cylinder to the diameter of the base circle of the gear which is to be tested, a slideway disposed in a plane which is parallel to the planar operative surface of the generating bar and is adjustably inclined to the said first sliding direction of the generating slide, the auxiliary slide being engaged with said slideway for movement guided by said slideway, a feeler mounted on the support member and adapted to traverse the involute profile and a helical line of a tooth flank of a gear which is to be tested, the inclined slideway and the feeler being disposed at relative positions on the support member for the gear which is to be tested to be located therebetween.

2. An instrument according to claim 1, characterized in that the said support member for the feeler and the inclined slideway is the bed of the instrument.

3. An instrument according to claim 1, characterized in that the pivot pin of the ratio lever is disposed coaxially with the spindle of the gear to be tested.

4. An instrument according to claim 1, characterized in that the feeler is adjustable on the support in parallel to the axis of the gear to be tested and in both transverse directions relative to said axis.

5. An instrument according to claim 1, characterized in that the carrier of the inclined slideway is adjustable on the support in parallel to the axis of the gear to be tested.

6. An instrument according to claim 1, characterized in that the support is provided between the feeler and the inclined slideway, with a bearing housing for the gear to be tested, said bearing housing being disposed on compound slides and being provided with a slide track for the generating bar and with a slide track for the auxiliary slide.

References Cited

UNITED STATES PATENTS 2,770,048   11/1956   Ernst _____ 33—179.5

SAMUEL S. MATTHEWS, Primary Examiner

UNITED STATES PATENT OFFICE
CERTIFICATE OF CORRECTION

Patent No. 3,513,557   Dated June 8, 1970

Inventor(s) KARL MULLER

It is certified that error appears in the above-identified patent and that said Letters Patent are hereby corrected as shown below:

Column 2, line 22, the paragraph beginning in this line should be cancelled as it does not appear in the application as filed.

Column 2, line 72 - Column 3, line 1, the words ... a rotatable ... should be replaced by ... an angularly adjustable ... (See Amendment 1 top of page 2).

Column 5, line 8, ... helix ... should be ... tooth ... line 10, ... tooth ... should be ... helix ...

SIGNED AND SEALED
SEP 22 1970

(SEAL)
Attest:

Edward M. Fletcher, Jr.
Attesting Officer

WILLIAM E. SCHUYLER, JR.
Commissioner of Patents